United States Patent
Wu et al.

(10) Patent No.: US 11,651,134 B2
(45) Date of Patent: *May 16, 2023

(54) METHOD OF CERTIFYING SAFETY LEVELS OF SEMICONDUCTOR MEMORIES IN INTEGRATED CIRCUITS

(71) Applicants: TAIWAN SEMICONDUCTOR MANUFACTURING COMPANY, LTD., Hsinchu (TW); TSMC CHINA COMPANY, LIMITED, Shanghai (CN)

(72) Inventors: Ching-Wei Wu, Hsinchu (TW); Ming-En Bu, Hsinchu (TW); He-Zhou Wan, Hsinchu (TW); Hidehiro Fujiwara, Hsinchu (TW); Xiu-Li Yang, Hsinchu (TW)

(73) Assignees: TAIWAN SEMICONDUCTOR MANUFACTURING CO., LTD., Hsinchu (TW); TSMC CHINA COMPANY, LIMITED, Shanghai (CN)

( * ) Notice: Subject to any disclaimer, the term of this patent is extended or adjusted under 35 U.S.C. 154(b) by 55 days.

This patent is subject to a terminal disclaimer.

(21) Appl. No.: 17/334,172

(22) Filed: May 28, 2021

(65) Prior Publication Data

US 2021/0383052 A1 Dec. 9, 2021

Related U.S. Application Data

(63) Continuation of application No. 16/897,056, filed on Jun. 9, 2020, now Pat. No. 11,042,688.

(51) Int. Cl.
*G06F 30/00* (2020.01)
*G06F 30/398* (2020.01)
(Continued)

(52) U.S. Cl.
CPC .......... *G06F 30/398* (2020.01); *G11C 11/413* (2013.01); *H01L 27/11* (2013.01); *G06F 2119/02* (2020.01)

(58) Field of Classification Search
CPC .... G06F 30/398; G06F 2119/02; H01L 27/11; G11C 11/413
See application file for complete search history.

(56) References Cited

U.S. PATENT DOCUMENTS

| 4,716,314 A | 12/1987 | Mulder et al. |
| 5,867,400 A | 2/1999 | El-Ghoroury et al. |

(Continued)

FOREIGN PATENT DOCUMENTS

| CN | 108604275 | 9/2018 |
| CN | 109542711 | 3/2019 |

(Continued)

OTHER PUBLICATIONS

Office Action dated Jan. 28, 2022 for corresponding case No. TW 11120108820. (pp. 1-5).

*Primary Examiner* — Naum Levin
(74) *Attorney, Agent, or Firm* — Haputman Ham, LLP

(57) ABSTRACT

A method includes specifying a target memory macro, and determining failure rates of function-blocks in the target memory macro based on an amount of transistors and area distributions in a collection of base cells. The method also includes determining a safety level of the target memory macro, based upon a failure-mode analysis of the target memory macro, from a memory compiler, based on the determined failure rate.

20 Claims, 13 Drawing Sheets

(51) Int. Cl.
  *H01L 27/11*    (2006.01)
  *G11C 11/413*   (2006.01)
  *G06F 119/02*   (2020.01)

(56) References Cited

U.S. PATENT DOCUMENTS

| | | | |
|---|---|---|---|
| 5,974,247 | A | 10/1999 | Yonezawa |
| 6,278,964 | B1 | 8/2001 | Fang et al. |
| 6,869,808 | B2 | 3/2005 | Yonezawa et al. |
| 7,003,738 | B2 | 2/2006 | Bhattacharya et al. |
| 7,039,882 | B2 | 5/2006 | Rana et al. |
| 7,260,442 | B2 | 8/2007 | Hwang et al. |
| 7,672,152 | B1 | 3/2010 | Kulkarni et al. |
| 7,673,210 | B2 | 3/2010 | Benvenga |
| 7,937,679 | B2 | 5/2011 | Mariani |
| 8,335,122 | B2 | 12/2012 | Dreslinski, Jr. et al. |
| 8,775,994 | B2 | 7/2014 | Weir et al. |
| 8,788,988 | B2 * | 7/2014 | Reed .............. G06F 30/39 716/136 |
| 9,037,928 | B2 | 5/2015 | Kleveland et al. |
| 9,157,955 | B2 * | 10/2015 | Hemon ............ G01R 31/31717 |
| 9,256,709 | B2 | 2/2016 | Yu et al. |
| 9,898,379 | B2 | 2/2018 | Mariani |
| 10,013,296 | B2 | 7/2018 | El-Maleh et al. |
| 10,140,049 | B2 | 11/2018 | Schubert et al. |
| 10,360,991 | B2 | 7/2019 | Sunada et al. |
| 10,592,627 | B2 | 3/2020 | Chidambarrao et al. |
| 10,643,011 | B1 | 5/2020 | Nardi et al. |
| 10,690,719 | B2 | 6/2020 | Heron et al. |
| 10,838,835 | B2 * | 11/2020 | Smith ............... G06F 11/263 |
| 11,042,688 | B1 * | 6/2021 | Wu .................. G06F 30/398 |
| 2014/0040838 | A1 | 2/2014 | Liu et al. |
| 2014/0173548 | A1 * | 6/2014 | Greb ................ G06F 30/398 716/136 |
| 2014/0380001 | A1 | 12/2014 | Schubert et al. |
| 2015/0278429 | A1 | 10/2015 | Chang |
| 2018/0253390 | A1 | 9/2018 | Tsukidate et al. |
| 2019/0393334 | A1 | 12/2019 | Weyers et al. |
| 2020/0227328 | A1 | 7/2020 | Anjum |

FOREIGN PATENT DOCUMENTS

| | | | | |
|---|---|---|---|---|
| CN | 113742795 | A * | 12/2021 | ........... G06F 30/398 |
| JP | 2017173242 | A * | 9/2017 | ........... G06F 11/008 |
| TW | 200719661 | | 5/2007 | |
| TW | 201611145 | | 3/2016 | |
| TW | 201706841 | | 2/2017 | |
| TW | 202145054 | A * | 12/2021 | ........... G06F 30/398 |
| TW | I759943 | B * | 4/2022 | ........... G06F 30/398 |
| WO | WO-2020125839 | A1 * | 6/2020 | ............ G06F 21/31 |

* cited by examiner

| Base cells | Transistor | Area (um^2) |
|---|---|---|
| Timer (202) | 445 | 57.04 |
| R&W Controller (304) | 366 | 33.36 |
| DIN (212) | 137 | 4.28 |
| DOUT (214) | 36 | 6.46 |
| SA (216) | 22 | 2.44 |
| YPASS (218) | 156 | 4.25 |
| XPDEC (221) | 46 | 127.94 |
| YPDEC (222) | 204 | 42.65 |
| XDEC (223) | 23 | 69.57 |
| YDEC (224) | 121 | 177.37 |
| WLDRV (226) | 44 | 2.47 |
| Bitcell (232) | 6 | 0.09072 |

| 1-Block | 1-Block | Transistor | Distribution in Block (by Transistor) | Distribution in Macro (by Transistor) | Area (um^2) | Distribution in Macro (by area) |
|---|---|---|---|---|---|---|
| CTRL | Timer | 445 | 13% | 0.01% | 57.04 | 0.07% |
| | R&W Controller | 2852 | 87% | 0.07% | 1829.27 | 2.39% |
| IO | DIN | 5480 | 9% | 0.14% | 1380.56 | 1.81% |
| | DOUT | 1440 | 2% | 0.04% | 4134.25 | 5.41% |
| | SA | 1760 | 3% | 0.04% | 787.05 | 1.03% |
| | YPASS | 49920 | 85% | 1.25% | 5483.52 | 7.17% |
| | XPDEC | 2394 | 17% | 0.06% | 127.94 | 0.17% |
| | YPDEC | 204 | 1% | 0.01% | 42.65 | 0.06% |
| DECODER | XDEC | 92 | 1% | 0.00% | 69.57 | 0.09% |
| | YDEC | 242 | 2% | 0.01% | 177.37 | 0.23% |
| | WLDRV | 11264 | 79% | 0.28% | 2530.34 | 3.31% |
| Cell-Array | Cell-Array | 3932160 | 100% | 98.10% | 59825.85 | 78.26% |

Fig. 4

| No | Block/Subblock Name | Block/Component Type | Failure Rate | Failure Rate Transient | Amount of Transistors / Gates | Area | Latch/Flip/Flops/Memories (transient distribution) |
|---|---|---|---|---|---|---|---|
| 1 | Timer | CTRL | 2.778E-06 | 0.000 | 445 | 57.04 | 0.00 |
| 2 | R&W Control | CTRL | 1.781E-05 | 0.000 | 2852 | 1829.27 | 0.00 |
| 3 | DIN | IO | 3.421E-05 | 0.001 | 5480 | 1382.56 | 80.00 |
| 4 | DOUT | IO | 8.991E-06 | 0.001 | 1440 | 4134.25 | 40.00 |
| 5 | SA | IO | 1.099E-05 | 0.000 | 1760 | 787.05 | 0.00 |
| 6 | YPASS | IO | 3.117E-04 | 0.000 | 49920 | 5483.52 | 0.00 |
| 7 | XPASS | DECODER | 1.495E-05 | 0.000 | 2394 | 127.94 | 14.00 |
| 8 | YPDEC | DECODER | 1.274E-06 | 0.000 | 204 | 42.65 | 4.00 |
| 9 | XPDEC | DECODER | 5.744E-07 | 0.000 | 92 | 69.57 | 0.00 |
| 10 | YDEC | DECODER | 1.511E-06 | 0.000 | 242 | 177.37 | 0.00 |
| 11 | WLDRV | DECODER | 7.033E-05 | 0.000 | 11264 | 2530.34 | 0.00 |
| 12 | Cell-Array | Cell-Array | 1.201E-03 | 9.998 | 3846144 | 59825.85 | 655360.00 |

Fig. 5

| No | Block / Sub-block name | Block Type | λ (static) | λ (trasient) | Failure Mode (FM) for the block | FM distribution | FM distribution transient | Effect description of the FM | SG V01 |
|---|---|---|---|---|---|---|---|---|---|
| 1 | Timer | CTRL | 0.000 | 0.000 | Timer Stuck at 0/1 | 33.3% | 0.0% | Output data freeze | S |
| 1 | Timer | CTRL | 0.000 | 0.000 | Timer timing shift out of spec | 33.3% | 0.0% | Output data delay | S |
| 1 | Timer | CTRL | 0.000 | 0.000 | Timer oscillation | 33.3% | 0.0% | Output data corruption due to function failure | S |
| 2 | R&W control | CTRL | 0.000 | 0.000 | Read gradual control signals | 33% | 0.0% | Multi-bits output data corruption due to read function failure | S |
| 2 | R&W control | CTRL | 0.000 | 0.000 | Write gradual control signals | 11% | 0.0% | Multi-bits output data corruption due to write function failure | S |
| 2 | R&W control | CTRL | 0.000 | 0.000 | Power management control signals | 11% | 0.0% | Memory not entering power management modes | N |
| 2 | R&W control | CTRL | 0.000 | 0.000 | Power management control signals | 11% | 0.0% | Multi-bits output data corrupt, All output 0 | S |
| 2 | R&W control | CTRL | 0.000 | 0.000 | Power management control signals | 11% | 0.0% | Output data delay or corrupt | S |

Fig. 6

| Safety Goal Violations (SGVs) | SPFM | LFM | $\Sigma\lambda_{SPF}$ | $\Sigma\lambda_{MPF}$ |
|---|---|---|---|---|
| Output data corruption | 85.125% | 100.000% | 6.020877E-05 | 0.000000E+00 |
| Overall IP / Chip Metrics | 85.125% | 100.000% | 0.00006021 | 0.00000000 |
| Overall IP / Chip Metrics for transient faults | 98.988% | 100.000% | 0.1012 | 0.0000 |

Fig. 7

| TSN16FFCLLSVTA16384X39M16SWBASHODCP | | WD | WW | MUX | CRED | PM |
|---|---|---|---|---|---|---|
| | | 8192 | 16 | 16 | 0 | 0 |
| 1-Block | 2-Block | Transistor | Distribution in Block (by Transistor) | Distribution in Macro (by Transistor) | Area (um^2) | Distribution in Macro (by area) |
| CTRL | Timer | 445 | 26% | 0.06% | 57.04 | 0.32% |
| | R&W Controller | 1281 | 74% | 0.16% | 404.90 | 2.29% |
| IO | DIN | 2192 | 17% | 0.27% | 552.22 | 3.12% |
| | DOUT | 576 | 4% | 0.07% | 1653.70 | 9.35% |
| | SA | 352 | 3% | 0.04% | 157.41 | 0.89% |
| | YPASS | 9984 | 76% | 1.23% | 1096.70 | 6.20% |
| DECODER | XPDEC | 1290 | 18% | 0.16% | 127.94 | 0.72% |
| | YPDEC | 204 | 3% | 0.03% | 42.65 | 0.24% |
| | XDEC | 46 | 1% | 0.01% | 69.57 | 0.39% |
| | YDEC | 121 | 2% | 0.01% | 177.37 | 1.00% |
| | WLDRV | 5632 | 77% | 0.70% | 1265.17 | 7.16% |
| Cell-Array | Cell-Array | 786432 | 100% | 97.26% | 12076.65 | 68.30% |
| Total | | 808556 | | | 17681.31 | |

Fig. 8A

| Safety Goal Violations (SGVs) | SPFM | LFM | $\Sigma\lambda_{SPF}$ | $\Sigma\lambda_{MPF}$ |
|---|---|---|---|---|
| Output data corruption | 84.513% | 100.000% | 5.941166E-05 | 0.000000E+00 |
| Overall IP / Chip Metrics | 84.513% | 100.000% | 0.00005941 | 0.00000000 |
| Overall IP / Chip Metrics for transient faults | 98.988% | 100.000% | 0.1012 | 0.0000 |

Fig. 8B

METHOD OF CERTIFYING SAFETY LEVELS OF SEMICONDUCTOR MEMORIES IN INTEGRATED CIRCUITS

PRIORITY CLAIM

This application is a continuation of U.S. application Ser. No. 16/897,056, filed Jun. 9, 2020, which is herein incorporated by reference in its entirety.

BACKGROUND

Integrated Circuits (ICs) are widely used in various electronic systems and equipment, such as, automotive controls, airplanes, data processing systems, portable devices, computers, and televisions. The reliability and safety requirements of many electronic systems require their subsystems (e.g., the IC components used) be subject to analytical techniques to obtain their failure rates, failure modes and diagnostic capability. One of the commonly used analytical techniques is Failure Modes, Effects, and Diagnostic Analysis (FMEDA). In many manufacturing processes and protocols, it is part of the requirements that memory ICs be subject to FMEDA analysis.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4 is a table listing the accumulated areas and the accumulated amount of transistors associated with the function-blocks of the SRAM in FIG. 1, in accordance with some embodiments.

FIG. 5 is a table listing the static failure rates and the transient failure rates associated with the function-blocks of the SRAM in FIG. 1, in accordance with some embodiments.

FIG. 6 is a table listing the failure-modes and the failure-mode distribution of two example function-blocks of the SRAM in FIG. 1, in accordance with some embodiments.

FIG. 7 is a table listing the Single Point Fault Metric and the Latent Fault Metric of various Safety Goal Violations, calculated based on the table in FIG. 4, in accordance with some embodiments.

FIG. 8A is a table generated based on the specified parameters of another target memory macro and based on the collection of base cells as listed in the table 300, in accordance with some embodiments.

FIG. 8B is a table listing the Single Point Fault Metric and the Latent Fault Metric of various Safety Goal Violations, calculated based on the table in FIG. 8A, in accordance with some embodiments.

DETAILED DESCRIPTION

Figure 1:
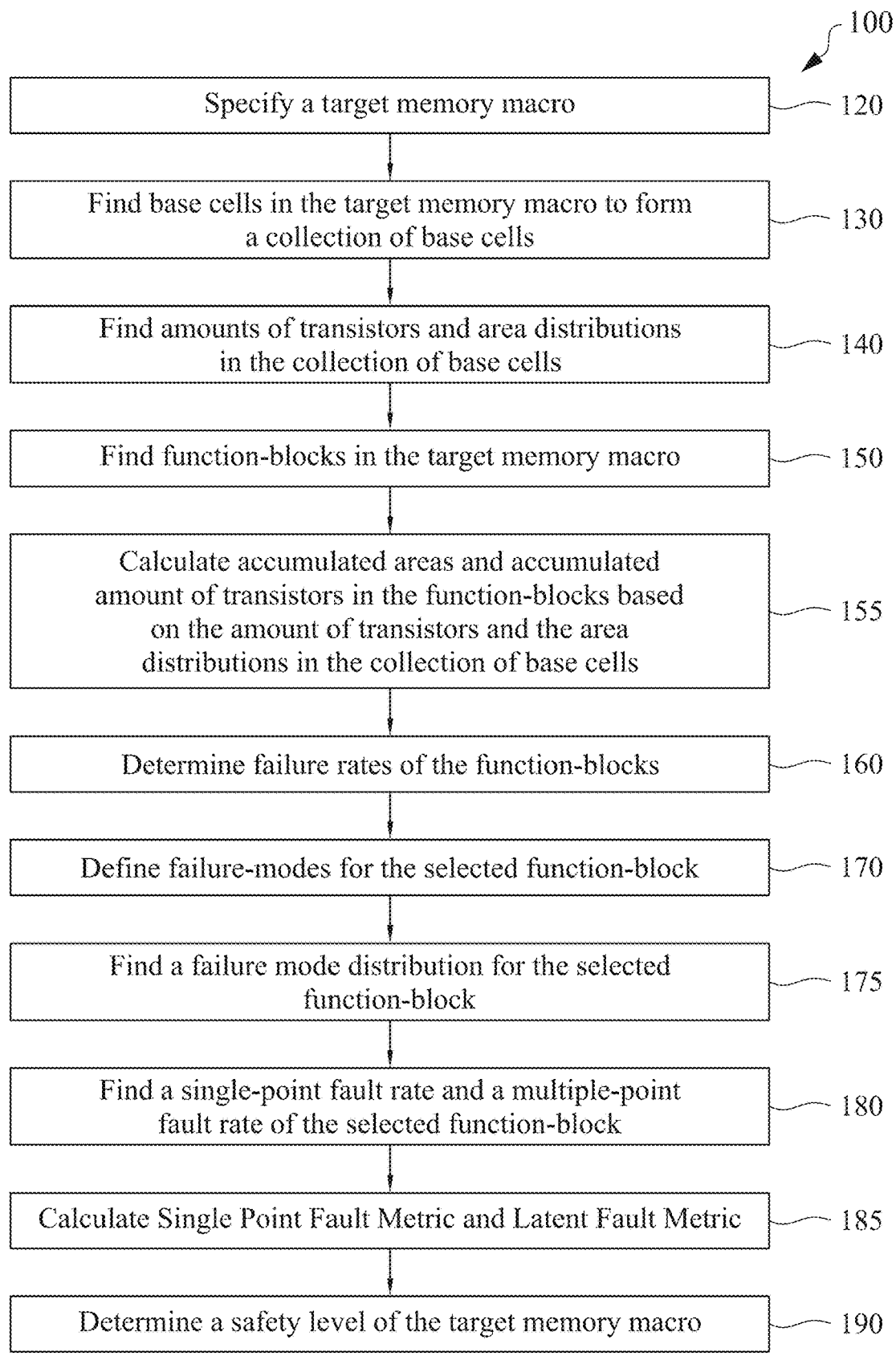
FIG. 1 is a flow chart of a process of certifying safety levels of memory macros, in accordance with some embodiments.

The following disclosure provides many different embodiments, or examples, for implementing different features of the provided subject matter. Specific examples of components, materials, values, steps, operations, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

More and more IC designs in the form of Intellectual Property (IP) core are used in automotive fields. Failure Mode Effects and Diagnostic Analysis (FMEDA) are popular methods to certify IP hardware for the Automotive Safety Integrity Levels (ASIL), a safety standard defined under ISO-26262 by International Organization for Standardization (ISO). Some commonly used IPs are memory macros, such as Static Random-Access Memory (SRAM) macros, read-only memory (ROM) macros, or Content Addressable Memory (CAM) macros.

Depending upon a specific design of the electronic system that uses one or more SRAM macros, the SRAM macros are often provided with various sizes and various types. In some embodiments, the sizes of SRAM macros are in a range measured from a few kilobytes to hundreds of megabytes or to gigabytes. In some embodiments, the types of SRAM macros differ in the number of ports of the SRAM bitcell for constructing the cell-array in the SRAM macros (such as one-port SRAM, two-ports SRAM, and quad-ports SRAM). In some embodiments, the architecture of the bitcell for constructing the cell-array in the SRAM macros differs in the number of transistors in the SRAM bitcell (such as, six transistors 6T SRAM cell, eight transistors 8T SRAM cell, ten transistors 10T SRAM cell, or twelve transistors 12T SRAM cell). In some embodiments, the types of SRAM macros are Synchronous or Asynchronous. In some embodiments, the types of SRAM macros differ in other aspect of the designs, such as Zero Bus Turnaround (ZBT) SRAM, Double Data Rate (DDR) SRAM, or Quad Data Rate (QDR) SRAM.

For improving the EDA process for SRAM macros designs, some memory compilers generate SRAM macros with different sizes and/or different types, in some embodiments. For example, the specific size and specific type of an SRAM macro generated by a memory compiler is determined by one or more parameters provided to the memory compiler.

When a specific SRAM macro is certified for Automotive Safety Integrity Levels (ASIL) as required by ISO-26262, the SRAM macro is classified into one of the four ASIL levels: ASIL A, ASIL B, ASIL C, and ASIL D. For determining the ASIL level of an SRAM macro, the Single Point Fault Metric (SPFM) and the Latent Fault Metric (LFM) need to be calculated based on various failure rates of the SRAM macro, which are related to the specific design of the SRAM macro such as the size and the type of the SRAM macro. One method of certifying a specific SRAM macro for ASIL safety levels involves finding the function blocks for constructing the specific SRAM, and finding the amount of transistors in various function blocks and/or the area occupied by various function blocks. For each specific SRAM macro, the processes of finding the function blocks and finding the amount of transistors and/or areas of a function block are carried out specifically for the particular SRAM macro of interest. Because of the number of possible variations of SRAM macros in terms of the size and the type, the process of certifying each SRAM macro individually may result in reduced efficiency in productivity, when there are a large number of SRAM macros that need to be certified for ASIL safety levels. An improved process of certifying SRAM macros with a memory compiler provides an improvement in certification productivity in some embodiments.

FIG. 1 is a flow chart of a process 100 of certifying safety levels of memory macros, in accordance with some embodiments. The process 100 includes blocks 120-150, 155, 160, 170, 175, 180, 185, and 190. At block 120, a target memory macro is specified with one or more parameters. Examples of the parameters for specifying the target memory macro include one or more of the following: a size parameter to specify the memory size (e.g., a number in units of kilobytes, megabytes, or gigabytes), a port parameter specifying the number of ports in the bitcell (e.g., single port or double port), and a parameter to specify whether the memory is a synchronous memory or an asynchronous memory.

In some embodiments, the process 100 in FIG. 1 is implemented in the memory compiler to certify safety levels of memory macros generated by the memory compiler. In some embodiments, when the target memory macro is generated by the memory compiler, the memory compiler receives the specifying parameters from a configuration file as input. In some embodiments, the memory compiler generates the target memory macro with different views expressed in multiple files. Examples of the files generated by the memory compiler include the file for describing the schematic, the file for describing the layout, one or more files expressed in a hardware description language (e.g., Verilog) framework for behavioral model view, logic view, timing view, and power view. In a bare bones configuration, the target memory macro includes a file for describing the layout of the memory design.

Figure 2:
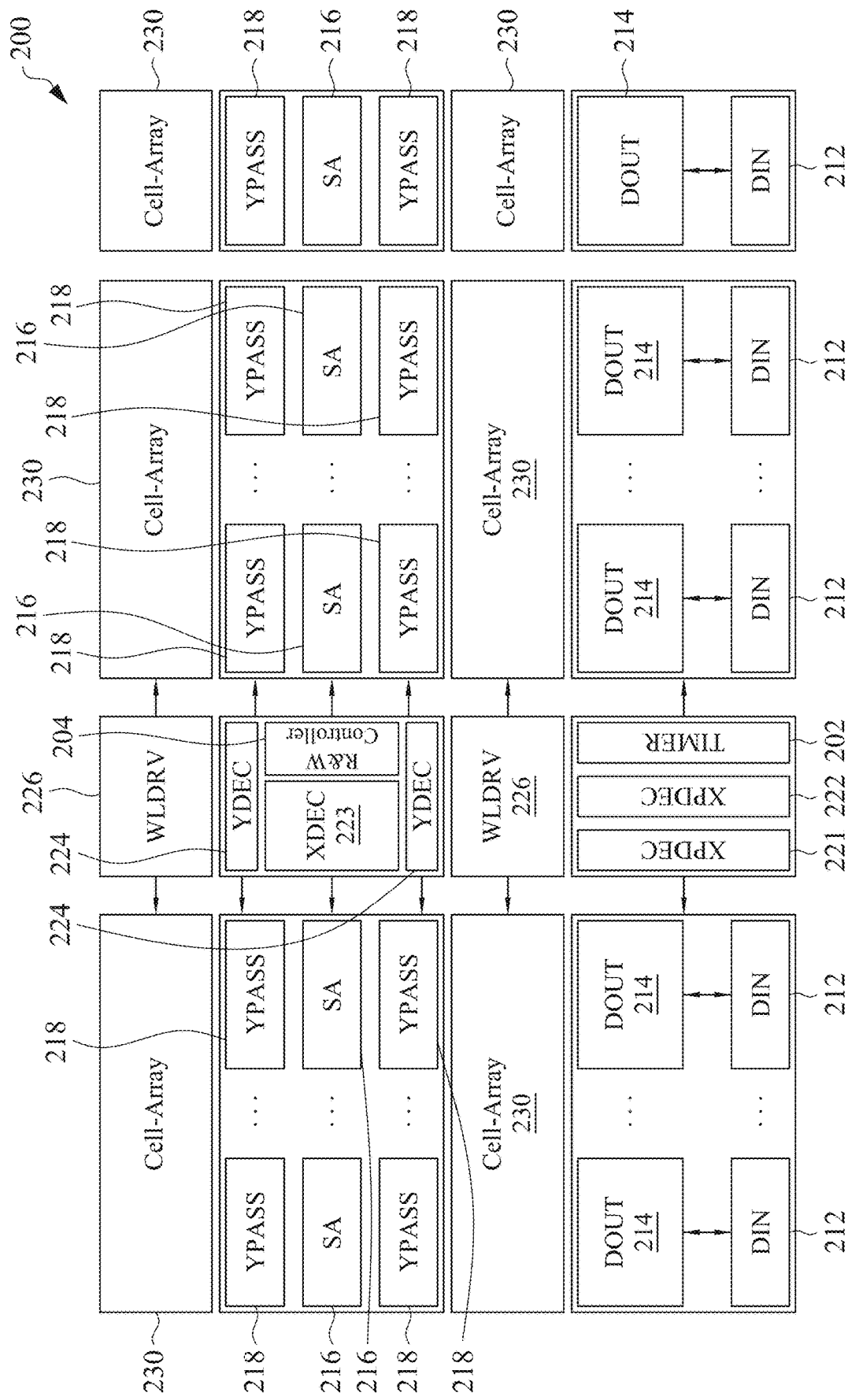
FIG. 2 is a schematic diagram of a floor plan of Static Random-Access Memory (SRAM), in accordance with some embodiments.

In the process 100 of FIG. 1, at block 130, base cells in the target memory macro are identified to form a collection of base cells. The collection of base cells is selected for certifying safety levels of memory macros. While it is possible to form the collection of base cells in a variety of different ways, in some embodiments, the collections of base cells have one or more characteristics in common. In some embodiments, each base cell constitutes a representative of a cell class or a cell type. In some embodiments, a collection of base cells has a sufficient number of cell classes to enable many different memory macros to be constructed with the instances of the cell classes associated with the base cells. In some embodiments, the collection of base cells includes all unique cell types for constructing an SRAM macro. In alternative embodiments, after all unique cell types for constructing a SRAM macro are identified, some cell types that have no correlation to ASIL safety levels of the SRAM macro are not included in the collection of base cells. In one embodiment, a floor plan 200 of an SRAM, as shown in FIG. 2, is analyzed to find the base cells, which are used as tiles for covering the floor plan of the layout design. In FIG. 2, the base cells for constructing the SRAM macro include the timer cell 202, the read-and-write controller cell 204, the data-input cell 212, the data-output cell 214, the sense amplifier cell 216, and the column multiplexer cell 218. The base cells for constructing the SRAM macro also include the row pre-decoding decoder 221, the column pre-decoding decoder 222, the row address decoder 223, the column address decoder 224, the word-line driver 226, and the individual bitcell for forming the cell-array 230. In some embodiments, when an SRAM memory macro includes a Library Exchange Format (LEF) file (e.g., a file with the extension ".lef") for describing the abstract view of cells, the base cells for constructing the SRAM macro are obtained by finding the unique cell types in the LEF file. In some embodiments, leafcells or tiles for covering the floor plan of a layout design are analyzed to find the base cells. A leafcell, when used as a tile for covering a floor plan of a layout design, generally specifies a boundary of a corresponding cell. In some embodiments, the leafcells for covering the floor plan of a layout design are obtained by analyzing the LEF file, because the LEF file incudes the information about the boundary, pin position and metal layer information of a cell.

Figure 3:
FIG. 3 is a table listing the amount of transistors and the area distributions in a collection of base cells, in accordance with some embodiments.

In the process 100 of FIG. 1, after the base cells are selected (at block 130), the amount of transistors and the area distributions in the collection of base cells are determined (at block 140). The failure rate of a given individual base cell is generally related to the amount of transistors and the area occupied by the given individual base cell. FIG. 3 is a table 300 listing the amount of transistors and the area distributions in a collection of base cells, in accordance with some embodiments. The table 300 includes columns 310, 320, and 330. The column 310 lists the names of the base cell chosen from the collection of base cells. The column 320 lists the amount of transistors used by the base cell chosen from the collection of base cells. The column 330 lists the area occupied by the base cell chosen from the collection of base cells. The format of the table 300 in FIG. 3 is provided as an example, other formats for listing the amount of transistors and the area distributions are within the contemplated scope of the present disclosure.

An entry (e.g., a row) in the table 300 maps a chosen base cell to a corresponding amount of transistors in the chosen base cell and to a corresponding area occupied by the chosen base cell. For example, in the table 300, each of the timer cell 202, the read-and-write controller cell 204, the data-input cell 212, the data-output cell 214, the sense amplifier cell 216, and the column multiplexer cell 218 has an amount of transistors listed in the column 320 as the corresponding integers 445, 366, 137, 36, 22, and 156. Each of the timer cell 202, the read-and-write controller cell 204, the data-input cell 212, the data-output cell 214, the sense amplifier cell 216, and the column multiplexer cell 218 has an area listed in the column 330 as the corresponding real numbers 57.04, 33.36, 4.28, 6.46, 2.44, and 4.25, in the unit of square micrometers. Furthermore, in the table 300, each of the row pre-decoding decoder 221, the column pre-decoding decoder 222, the row address decoder 223, the column address decoder 224, and the word-line driver 226 has an amount of transistors listed in the column 320 as the corresponding integers 46, 204, 23, 121, and 44. Each of the row pre-decoding decoder 221, the column pre-decoding decoder 222, the row address decoder 223, the column address decoder 224, and the word-line driver 226 has an area listed in the column 330 as the corresponding real numbers 127.94, 42.65, 69.57, 177.37, and 2.47, in the unit of square micrometers. In the table 300, the bitcell 232 is a six-transistor (6T) SRAM cell, which occupies an area of 0.09072 square micrometers.

In the process 100 of FIG. 1, after the amount of transistors and the area distributions in the collection of base cells are determined (at block 140), function-blocks in the target memory macro are determined (at block 150). As an example, when the floor plan 200 of the SRAM in FIG. 2 is analyzed, the function-blocks in the target memory macro include function-blocks TIMER, R&W CONTROLLER, DIN, DOUT, SA, YPASS, XPDEC, YPDEC, XDEC, YDEC, WLDRV, and CELL-ARRAY. In some embodiments, a target memory macro includes a file describing the physical view of the layout design, and the function-blocks are determined from the file describing the physical view. In some embodiments, the target memory macro includes a behavior model file expressed in a hardware description language (e.g., Verilog), and the function-blocks are determined based on one or more high level modules in the behavior model file.

In FIG. 2, the function-block TIMER includes a timer cell 202, and the function-block R&W CONTROLLER includes a read-and-write controller cell 204. In FIG. 2, the function-block DIN includes multiple instances of the data-input cell 212, the function-block DOUT includes multiple instances of the data-output cell 214, the function-block SA includes multiple instances of the sense amplifier cell 216, and the function-block YPASS includes multiple instances of the column multiplexer cell 218. In FIG. 2, the function-block XPDEC includes multiple instances of the row pre-decoding decoder 221, the function-block YPDEC includes multiple instances of the column pre-decoding decoder 222, the function-block XDEC includes multiple instances of the row address decoder 223, the function-block YDEC includes multiple instances of the column address decoder 224, and the function-block WLDRV includes multiple instances of the word-line driver 226. The function-block CELL-ARRAY generally includes bitcells 232 arranged in an array of a two-dimensional pattern.

In the process 100 of FIG. 1, at block 155, an accumulated area occupied by each function-block and an accumulated amount of transistors in each function-block are calculated based on the amount of transistors and the area distributions in the collection of base cells obtained at block 140. For example, in FIG. 4, a table 400 has multiple rows each listing an accumulated area and an accumulated amount of transistors associated with one of the function-blocks of the SRAM in FIG. 1. In one example, the table 400 is generated based on the parameters of the target memory macro and based on the amount of transistors and the area distributions in the collection of base cells as listed in the table 300. In at least one embodiment, the parameters of the target memory macro for generating the table 400 include a word-width (which is specified as 16384), a word-depth (which is specified as 39), a number of columns of a column multiplexer (which is specified as 16), and a PM number of the bit-cells (which is specified as one). The table 400 includes columns 410, 420, 430, 440, 450, 460, and 470.

In the table 400, the column 420 lists the names of the function-blocks. The function-blocks listed include TIMER, R&W CONTROLLER, DIN, DOUT, SA, YPASS, XPDEC, YPDEC, XDEC, YDEC, WLDRV, and CELL-ARRAY. The column 410 identifies the component type of each function-block in column 420. The component types listed include CTRL ("control"), IO ("input and output"), DECODER, and CELL-ARRAY. The function-blocks TIMER and R&W CONTROLLER belong to the component type CTRL. The function-blocks DIN, DOUT, SA, and YPASS belong to the component type IO. The function-blocks XPDEC, YPDEC, XDEC, YDEC, and WLDRV belong to the component type DECODER. The function-block CELL-ARRAY belongs to the component type CELL-ARRAY. The function-blocks and the component types in the table 400 are provided as examples, various additional function-blocks and various additional component types are within the contemplated scope of the present disclosure.

In the table 400, the column 430 lists the accumulated amount of transistors of the function-blocks. The column 440 lists the transistor distributions, in each row as contributed by the accumulated amount of transistors in the same row, measured as the percentage within the component type corresponding to the function-block in the same row. The column 450 lists the transistor distributions, in each row as contributed by the accumulated amount of transistors in the same row, measured as the percentage within the target memory macro. For example, the accumulated amounts of transistors, for the function-blocks DIN, DOUT, SA, and YPASS, are listed correspondingly in the column 430 as integer numbers 5480, 1440, 1760, and 49920. The transistor distributions measured as the percentage within the component type IO, for the function-blocks DIN, DOUT, SA, and YPASS, are listed correspondingly in the column 440 as 9%, 2%, 3%, and 85%. The transistor distributions measured as the percentage within the target memory macro, for the function-blocks DIN, DOUT, SA, and YPASS, are listed correspondingly in the column 450 as 0.14%, 0.04%, 0.04%, and 1.25%.

In the table 400, the column 460 lists the accumulated areas of the function-blocks. The column 470 lists the accumulated areas, in each row as contributed by the accumulated areas of the function-block in the same row, measured as the percentage within the target memory macro. For example, the accumulated areas, for the function-blocks DIN, DOUT, SA, and YPASS, are listed correspondingly in the column 460 as real numbers 1380.56, 4134.25, 787.05, and 5483.52. The accumulated areas measured as the percentage within the target memory macro, for the function-blocks DIN, DOUT, SA, and YPASS, are listed correspondingly in the column 470 as 1.81%, 5.41%, 1.03%, and 7.17%.

In the process 100 of FIG. 1, at block 160, failure rates of the function-blocks in the target memory macro are determined, based upon the accumulated areas and the accumulated amounts of transistors obtained at block 150. As an example, a table 500 in FIG. 5 has multiple rows each listing a static failure rate and a transient failure rate associated with one of the function-blocks of the SRAM in FIG. 1. The table 500 includes columns 510, 520, 530, 540, 550, 560, 570, and 580. The integers sequentially listed in the column 510 are index numbers for identifying individual rows of the table 500. The function-blocks listed in the column 520 include TIMER, R&W CONTROLLER, DIN, DOUT, SA, YPASS, XPDEC, YPDEC, XDEC, YDEC, WLDRV, and CELL-ARRAY. The component types listed in the column 530 include CTRL, IO, DECODER, and CELL-ARRAY. The format of the table 500 in FIG. 5 is provided as an example, other formats for listing the static failure rates and the transient failure rates are within the contemplated scope of the present disclosure.

In the table 500, the static failure rates and the transient failure rates of the function-blocks are correspondingly listed in the column 540 and the column 550. The accumulated amount of transistors and the accumulated area of the function-blocks are correspondingly listed in the column 560 and the column 570. The transient distributions of transient-type devices (e.g., latches, flip-flops, or bit memories) are listed in the column 580. For example, the static failure rates, for the function-blocks DIN, DOUT, SA, and YPASS, all of the component type IO, are listed correspondingly in the column 540 as real numbers 3.421E-05, 8.991E-06, 1.099E-05, and 3.117E-04. The transient failure rates, for the function-blocks DIN, DOUT, SA, and YPASS, all of the component type IO, are listed correspondingly in the column 550 as real numbers 0.001, 0.001, 0.000, and 0.000.

In the table 500, the accumulated amount of transistors, for the function-blocks DIN, DOUT, SA, and YPASS, are listed correspondingly in the column 560 as integer numbers 5480, 1440, 1760, and 49920 (which are the same as the integer numbers in the column 430 of the Table 400). The accumulated areas, for the function-blocks DIN, DOUT, SA, and YPASS, are listed correspondingly in the column 570 as real numbers 1380.56, 4134.25, 787.05, and 5483.52 (which are the same as the real numbers in the column 460 of the Table 400). The transient distributions, for the function-blocks DIN, DOUT, SA, and YPASS, are listed correspondingly in the column 580 as real numbers 80.00, 40.00, 0.00, and 0.00.

In the table 500, the function-block CELL-ARRAY has more transistors, occupies more areas, and has more transient type devices (e.g., latches, flip-flops, or bit memories) than other function-blocks in the table. The static failure rate of the function-block CELL-ARRAY (which is 1201E-03) dominates the static failure rates of all other function-blocks in the table. The transient failure rate of the function-block CELL-ARRAY (which is 9.998) dominates the transient failure rates of all other function-blocks in the table.

In the process 100 of FIG. 1, at block 170, failure-modes of the function-blocks are defined. Then, at block 175, failure-mode distribution of the function-blocks are determined. As an example, a table 600 in FIG. 6 is generated to list the failure-modes and the failure-mode distribution of two example function-blocks (i.e., TIMER and R&W CONTROLLER) of the SRAM in FIG. 1. In some embodiments, the failure-modes and the failure-mode distribution of one or more other function-blocks (or all function-blocks) in the target memory macro are listed in a table similar to the table 600. The format of the table 600 in FIG. 6 is provided as an example, other formats for listing the failure-modes and the failure-mode distribution are within the contemplated scope of the present disclosure.

In FIG. 6, the table 600 includes columns 610, 620, 630, 640, 650, 660, 670, 680, 690, and 695. The integers sequentially listed in the column 610 are identification numbers for the function-blocks in the table 600. Each function-block has a unique identification number. The names of the function-blocks are listed in the column 620. The component types of the function-blocks are listed in the column 630. The single-point fault rates of the function-blocks are listed in the column 640. The multiple-point fault rates of the function-blocks are listed in the column 650. The names of the failure-modes of the function-blocks are listed in the column 660. The failure-mode distributions of the function-blocks are listed in the column 670. The failure-mode distributions of the function-blocks for transient failure are listed in the column 680. The effect descriptions of the failure-mode are listed in the column 690. Each entry in the column 695 of the Table 600 identifies a Safety Goal Violation (SGV) status, that is, whether the SGV corresponding to the failure-mode in the row of the entry needs to be used in overall fault rate calculation. For example, it is identified (as letter "N" in the column 695) that the overall fault rate calculation does not need to include the failure rate due to the failure mode that memory is not entering power management modes.

In the process 100 of FIG. 1, after the failure-mode distribution of the function-blocks are determined (at block 175), the single-point fault rates and the multiple-point fault rates of the function-blocks are calculated (at block 180). Then, at block 185, the Single Point Fault Metric and the Latent Fault Metric of various SGVs are calculated. As an example, a table 700 in FIG. 7 has multiple rows each associated with one type of SGVs. The table 700 includes columns 710, 720, 730, 740, and 750. The names of the types of SGVs are listed in the columns 710. The Single Point Fault Metrics (SPFMs) for various SGVs are listed in the columns 720. The Latent Fault Metrics (LFMs) for various SGVs are listed in the columns 730. The total single-point fault rates ($\Sigma\lambda_{SPF}$) associated with various SGVs are listed in the columns 740. The total multiple-point fault rates ($\Sigma\lambda_{MPF}$) associated with various SGVs are listed in the columns 750. The format of the table 700 in FIG. 7 is provided as an example, other formats for listing the Single Point Fault Metrics and the Latent Fault Metrics are within the contemplated scope of the present disclosure.

As shown in the first row of the table 700, the total single-point fault rate ($\Sigma\lambda_{SPF}$) and the total multiple-point fault rate ($\Sigma\lambda_{MPF}$) associated with the SGV of output data corruption are correspondingly 6.020877E-05 and 0.000000E+00, while the SPFM and the LFM for the SGV of output data corruption are correspondingly 85.125% and 100.000%. As shown in the second row of the table 700, the total single-point fault rate ($\Sigma\lambda_{SPF}$) and the total multiple-point fault rate ($\Sigma\lambda_{MPF}$) associated with the SGV of overall IP (or chip) metrics are correspondingly 00.00006021 and 0.00000000, while the SPFM and the LFM for the SGV of overall IP (or chip) metrics are correspondingly 85.125% and 100.000%. As shown in the third row of the table 700, the total single-point fault rate ($\Sigma\lambda_{SPF}$) and the total multiple-point fault rate ($\Sigma\lambda_{MPF}$) associated with the SGV of overall IP (or chip) metrics for transient faults are correspondingly 0.1012 and 0.0000, while the SPFM and the LFM for the SGV of overall IP (or chip) metrics for transient faults are correspondingly 98.988% and 100.000%.

In the process 100 of FIG. 1, after the Single Point Fault Metric and the Latent Fault Metric of various SGVs are calculated (at block 185), a safety level of the target memory macro is determined (at block 190). In some embodiments, a safety level of the target memory macro is selected from the safety levels for Automotive Safety Integrity Levels (ASIL) certification. The ASIL safety levels, defined under ISO-26262, include ASIL A, ASIL B, ASIL C, and ASIL D. The minimal SPFM requirements and the minimal LFM requirements for the four ASIL safety levels are listed in the table below:

|        | SPFM         | LFM          |
| ------ | ------------ | ------------ |
| ASIL A | Not relevant | Not relevant |
| ASIL B | ≥90%         | ≥60%         |
| ASIL C | ≥97%         | ≥80%         |
| ASIL D | ≥99%         | ≥90%         |

In one embodiment, for determining the ASIL safety level of the target memory macro (with transistors-and-area distributions as listed in the table 400), the values of the SPFM and the LFM of the SGVs in the table 700 are compared with the minimal SPFM requirements and the minimal LFM requirements for the four ASIL safety levels. Because the SPFM of the overall IP in the table 700 for the target memory macro is only 85.125%, which is less than the minimal requirement of 90% for ASIL B, the ASIL safety level of the target memory macro (with transistors-and-area distributions as listed in the table 400) is ASIL A.

In the above example of determining the ASIL safety level of the target memory macro having the floor plane 200 of FIG. 2, the transistor-and-area distributions listed in the table 400 are determined based on the amount of transistors and the area distributions in the collection of base cells as listed in the table 300, using the specified parameters for the target memory macro. For generating the table 400, the specified word-width is 16384, the specified word-depth is 39, the specified number of the multiplexed-columns of a column multiplexer is 16, and the specified PM number is 1.

In another example, the same collection of base cells as listed in the table 300 is used for determining the ASIL safety level of a second target memory macro, which has the same floor plan 200 of FIG. 2 but has different specified parameters than the target memory macro for generating the transistors-and-area distributions in the table 400. FIG. 8A is a table 800 generated based on the specified parameters of the second target memory macro and based on the collection of base cells as listed in the table 300, in accordance with some embodiments. For generating the table 800, the specified word-width is 8192, the specified word-depth is 16, the specified number of the multiplexed-columns of a column multiplexer is 16, and the specified PM number is 0. Based on the table 800, after the operations at blocks 170, 175, and 180, the Single Point Fault Metric and the Latent Fault Metric of various SGVs are calculated (at block 185) for the second target memory macro. The calculated results are listed in a table 850 in FIG. 8B.

As shown in the first row of the table 850, the total single-point fault rate ($\Sigma\lambda_{SPF}$) and the total multiple-point fault rate ($\Sigma\lambda_{MPF}$) associated with the SGV of output data corruption are correspondingly 5.941166E-05 and 0.000000E+00, while the SPFM and the LFM for the SGV of output data corruption are correspondingly 84.513% and 100.000%. As shown in the second row of the table 850, the total single-point fault rate ($\Sigma\lambda_{SPF}$) and the total multiple-point fault rate ($\Sigma\lambda_{MPF}$) associated with the SGV of overall IP (or chip) metrics are correspondingly 0.00005941 and 0.00000000, while the SPFM and the LFM for the SGV of overall IP (or chip) metrics are correspondingly 84.513% and 100.000%. As shown in the third row of the table 850, the total single-point fault rate ($\Sigma\lambda_{SPF}$) and the total multiple-point fault rate ($\Sigma\lambda_{MPF}$) associated with the SGV of overall IP (or chip) metrics for transient faults are correspondingly 0.1012 and 0.0000, while the SPFM and the LFM for the SGV of overall IP (or chip) metrics for transient faults are correspondingly 98.988% and 100.000%.

When the values of the SPFM and the LFM of the SGVs in the table 850 are compared with the SPFM and LFM requirements of the ASIL safety levels, the ASIL safety level of the second target memory macro is determined. Because the SPFM of the overall IP for the second target memory macro is only 84.513%, which is less than the minimal requirement of 90% for ASIL B, the ASIL safety level of the second target memory macro (with the transistors-and-area distributions as listed in the table 800 in FIG. 8A) is ASIL A.

Figure 9A:
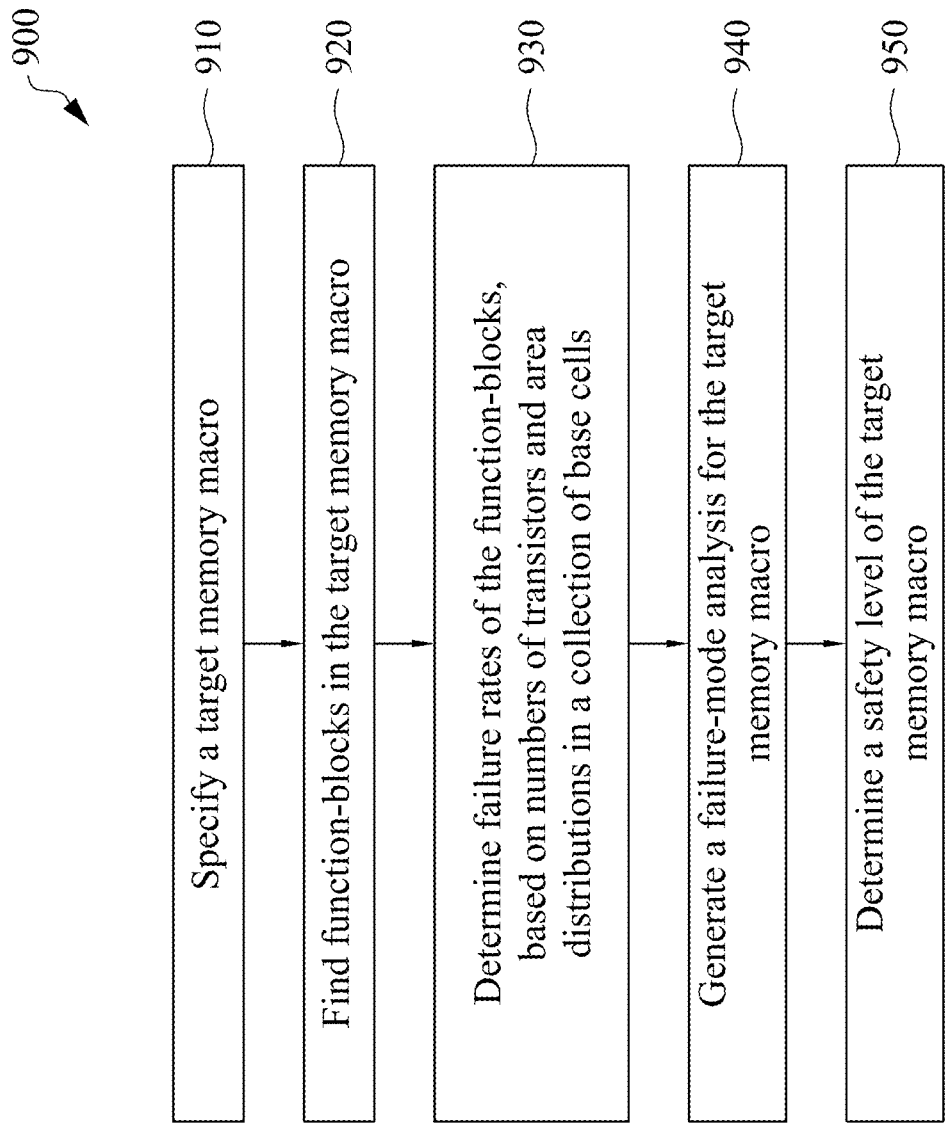
FIG. 9A is a flow chart of a process of certifying safety levels of memory macros, based upon transistor-and-area distributions in a collection of base cells, in accordance with some embodiments.

FIG. 9A is a flow chart of a process 900 of certifying safety levels of memory macros, based upon transistor-and-area distributions in a collection of base cells, in accordance with some embodiments. The process 900 includes blocks 910-950. At block 910, a target memory macro is specified with one or more parameters. In some embodiments, the memory size (e.g., a number in units of kilobytes, megabytes, or gigabytes) is specified with a size parameter. In some embodiments, the type of the bitcell (e.g., one-port bitcell, two-port bitcell, or dual-port bitcell) is specified with a feature parameter. In some embodiments, whether the target memory macro provides a synchronous memory or an asynchronous memory is specified by one of the parameters.

At block 920, function-blocks in the target memory macro are determined. In some embodiments, a target memory macro includes a file describing the physical view of the layout design, and the function-blocks are determined from the file describing the physical view. In some embodiments, the target memory macro include a behavior model file expressed in a hardware description language (e.g., Verilog), and the behavior model file is used to determine the function-blocks. In some embodiments, the function-blocks are determined based on one or more high level modules in the behavior model file. In some embodiments, the high level modules for the function-blocks include one or more of the following modules: the module for defining a timer, the module for defining a read-and-write controller, the module for defining a sense amplifier, the module for defining a column multiplexer, the module for a row pre-decoding decoder, the module for defining a pre-decoding decoder, the module for defining a row address decoder, the module for defining a column address decoder, the module for defining a word-line driver 226, the module for defining a cell-array, and the modules for defining various input and output of the cell-array.

At block 930, failure rates of the function-blocks are determined, based on amounts of transistors and area distributions in a collection of base cells. In some embodiments, the collection of base cells is formed from base cells selected from one or more memory macros, during a separate process that is independent from the operations at block 910 and 920. In some embodiments, the collection of base cells is used in the process for certifying safety levels of additional memory macros other type of bitcells than the bitcell in the Table 300. For example, in some embodiments, when a memory macro for safety level certification include bitcells in the form of eight-transistor (8T) SRAM cells, the table for listing the amount of transistors and the area distributions in a collection of base cells generally include an 8T SRAM cell as one of the entries. That is, the amount of transistors and the area occupied by the 8T SRAM cell is listed in the table functionally equivalent to the Table 300. Similarly, in some embodiments, when a memory macro for safety level certification includes other design variations of the base cells in the Table 300 (e.g., other base cell designs for row pre-decoding decoders, column pre-decoding decoders, row address decoders, and column address decoders), the amount of transistors and the area occupied by each base cell with other design variations are also listed in the table functionally equivalent to the Table 300.

In some embodiments, a base cell (as an entry in the table for listing a corresponding amount of transistors and a corresponding area) is provided in a form of a parameterized cell, and the corresponding amount of transistors and the corresponding area is determined by the parameters for specifying the parameterized base cell. For example, when a parameterized base cell for a column address decoder 324 includes the number of addressable columns, in some embodiments, the corresponding amount of transistors and the corresponding area for the base cell of the column address decoder depend upon the number of addressable columns.

At block 930, for determining the failure rates of one of the function-blocks, the accumulated area and the accumulated amount of transistors associated with the of the function-blocks are calculated based on the amount of transistors and the area distributions in the collection of base cells. In the embodiment of the process 100 in FIG. 1, the collection of base cells that is obtained from the selection of the base cells in the target memory macro. In alternative embodiments, the collection of the base cells is obtained in a process that does not depend upon the selection of the base cells in the target memory macro. For example, in some embodiments, the collection of the base cells is formed before the target memory macro is identified or specified with one or more parameters. In some embodiments, even when the collection of the base cells is obtained after the target memory macro is specified, the collection of the base cells is not obtained from the selection of the base cells in the specified target memory macro. In some embodiments, the collection of base cells includes base cells selected from more than one memory macros (e.g., a set of memory macros), when the collection of base cells is designed to be used in the processes of certifying safety levels of many memory macros which have various sizes, various types, and various features.

Figure 9B:
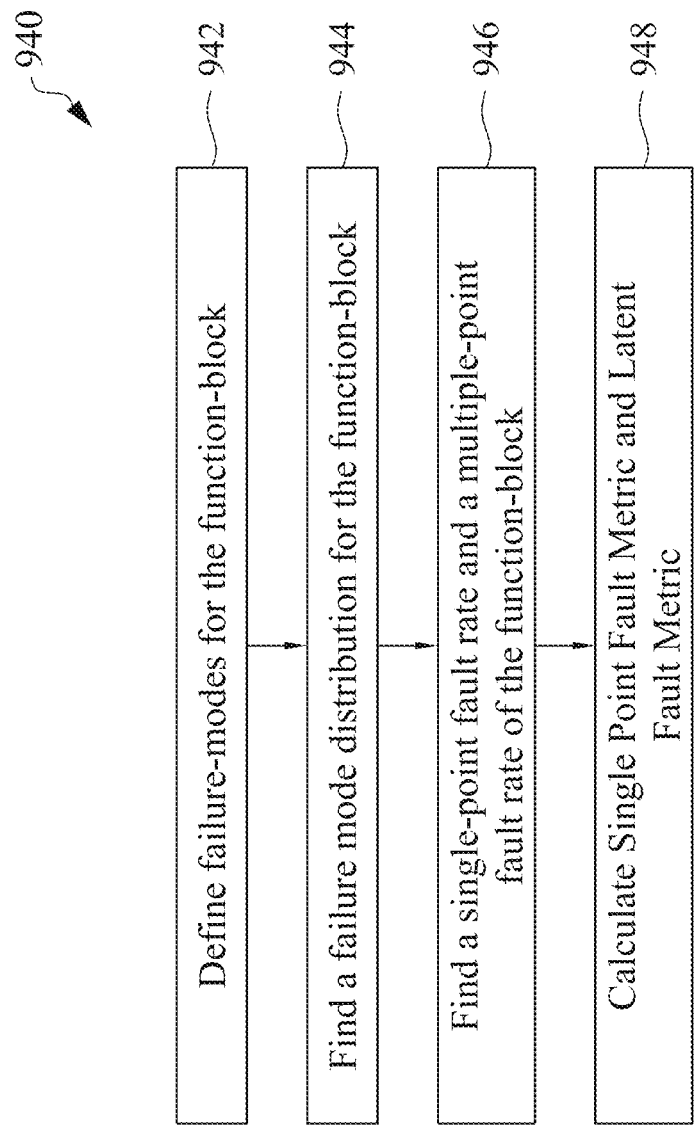
FIG. 9B is a flow chart of a process of generating the failure-mode analysis for the target memory macro, in accordance with some embodiments.

In the process 900 of FIG. 9A, after the failure rates of the function-blocks are determined (at block 930), a failure-mode analyses is generated for the target memory macro (at block 940). FIG. 9B is a flow chart of a process 940 for generating the failure-mode analysis for the target memory macro, in accordance with some embodiments. The process 940 includes blocks 942, 944, 946, and 948. At block 942, failure-modes for the function-block are defined. For example, for the failure-mode analyses of the target memory macro with the floor plan as shown in FIG. 2, the failure-modes of two example function-blocks (e.g., the timer, and read-and-write controller) are defined and listed in the Table 600 of FIG. 6. At block 944, failure mode distribution for the function-blocks are determined. In the example as shown in FIG. 6, the failure mode distribution for of the two example function-blocks (e.g., the timer, and read-and-write controller) are also listed in the Table 600. At block 946, a single-point fault rate and a multiple-point fault rate of the function-block are calculated. At block 948, the Single Point Fault Metric and the Latent Fault Metric for various Safety Goal Violations are calculated. For example, for the failure-mode analyses of the target memory macro with the floor plan as shown in FIG. 2, the Single Point Fault Metric (e.g., SPFM) and the Latent Fault Metric (e.g., LFM) for relevant Safety Goal Violations are listed in the Table 700 of FIG. 7, based on the calculated single-point fault rates (e.g. $\Sigma\lambda_{SPF}$) and the calculated multiple-point fault rates (e.g. $\Sigma\lambda_{MPF}$) of the function-blocks.

In the process 900 of FIG. 9A, after the failure-mode analyses is generated for the target memory macro (at block 940), a safety level of the target memory macro is determined (at block 950) based upon the failure-mode analysis is determined for the target memory macro. For example, the safety level of the target memory macro with the floor plan as shown in FIG. 2 is determined based the Single Point Fault Metric (e.g., SPFM) and the Latent Fault Metric (e.g., LFM) as listed in the Table 700 of FIG. 7.

Figure 10:
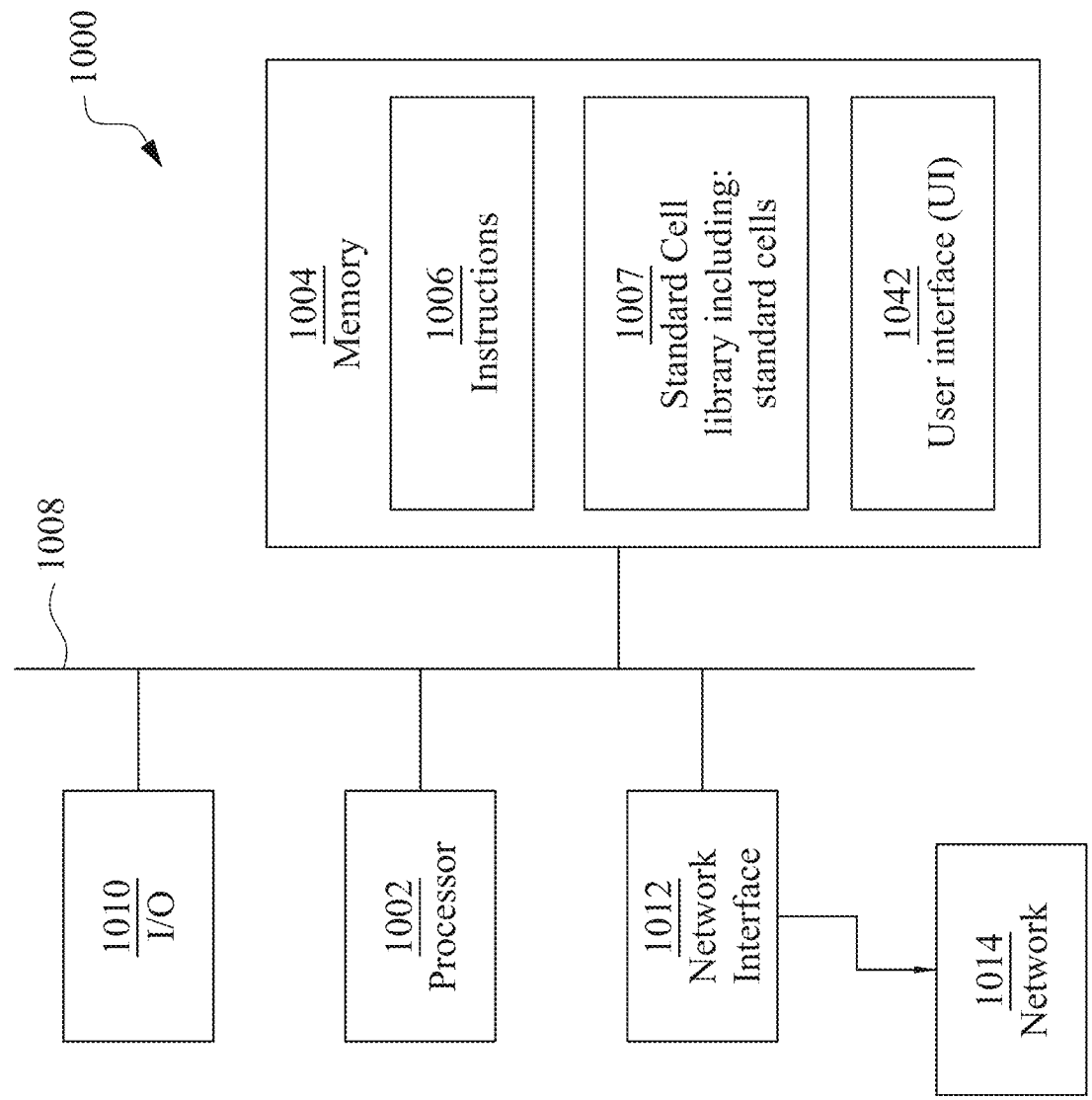
FIG. 10 is a block diagram of an electronic design automation (EDA) system in accordance with some embodiments.

FIG. 10 is a block diagram of an electronic design automation (EDA) system 900 in accordance with some embodiments.

In some embodiments, EDA system 1000 includes an APR system. Methods described herein of designing layout diagrams represent wire routing arrangements, in accordance with one or more embodiments, are implementable, for example, using EDA system 1000, in accordance with some embodiments.

In some embodiments, EDA system 1000 is a general purpose computing device including a hardware processor 1002 and a non-transitory, computer-readable storage medium 1004. Storage medium 1004, amongst other things, is encoded with, i.e., stores, computer program code 1006, i.e., a set of executable instructions. Execution of computer program code 1006 by hardware processor 1002 represents (at least in part) an EDA tool which implements a portion or all of, e.g., the methods described herein in accordance with one or more embodiments (hereinafter, the noted processes and/or methods).

Processor 1002 is electrically coupled to computer-readable storage medium 1004 via a bus 1008. Processor 1002 is also electrically coupled to an I/O interface 1010 by bus 1008. A network interface 1012 is also electrically connected to processor 1002 via bus 1008. Network interface 1012 is connected to a network 1014, so that processor 1002 and computer-readable storage medium 1004 are capable of connecting to external elements via network 1014. Processor 1002 is configured to execute computer program code 1006 encoded in computer-readable storage medium 1004 in order to cause system 1000 to be usable for performing a portion or all of the noted processes and/or methods. In one or more embodiments, processor 1002 is a central processing unit (CPU), a multi-processor, a distributed processing system, an application specific integrated circuit (ASIC), and/or a suitable processing unit.

In one or more embodiments, computer-readable storage medium 1004 is an electronic, magnetic, optical, electromagnetic, infrared, and/or a semiconductor system (or apparatus or device). For example, computer-readable storage medium 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1004 includes a compact disk-read only memory (CD-ROM), a compact disk-read/write (CD-R/W), and/or a digital video disc (DVD).

In one or more embodiments, storage medium 1004 stores computer program code 1006 configured to cause system 1000 (where such execution represents (at least in part) the EDA tool) to be usable for performing a portion or all of the noted processes and/or methods. In one or more embodiments, storage medium 1004 also stores information which facilitates performing a portion or all of the noted processes and/or methods. In one or more embodiments, storage medium 1004 stores library 1007 of standard cells including such standard cells as disclosed herein.

EDA system 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

EDA system 1000 also includes network interface 1012 coupled to processor 1002. Network interface 1012 allows system 1000 to communicate with network 1014, to which one or more other computer systems are connected. Network interface 1012 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 1000.

System 1000 is configured to receive information through I/O interface 1010. The information received through I/O interface 1010 includes one or more of instructions, data, design rules, libraries of standard cells, and/or other parameters for processing by processor 1002. The information is transferred to processor 1002 via bus 1008. EDA system 1000 is configured to receive information related to a UI through I/O interface 1010. The information is stored in computer-readable medium 1004 as user interface (UI) 1042.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 1000. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 11:
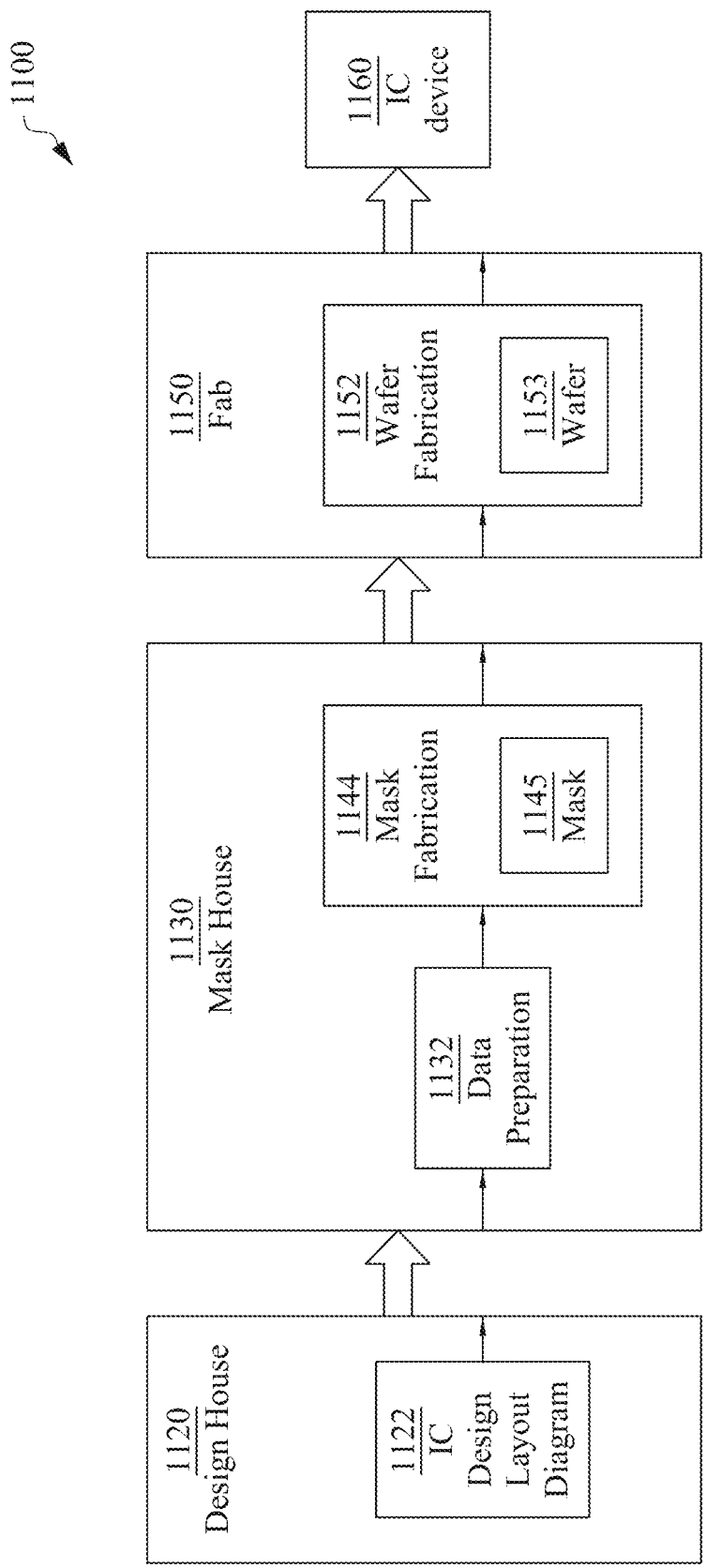
FIG. 11 is a block diagram of an integrated circuit (IC) manufacturing system, and an IC manufacturing flow associated therewith, in accordance with some embodiments.

FIG. 11 is a block diagram of an integrated circuit (IC) manufacturing system 1100, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1100.

In FIG. 11, IC manufacturing system 1100 includes entities, such as a design house 1120, a mask house 1130, and an IC manufacturer/fabricator ("fab") 1150, that interact with one another in the design, development, and manufacturing cycles and/or services related to manufacturing an IC device 1160. The entities in system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1120, mask house 1130, and IC fab 1150 is owned by a single larger company. In some embodiments, two or more of design house 1120, mask house 1130, and IC fab 1150 coexist in a common facility and use common resources.

Design house (or design team) 1120 generates an IC design layout diagram 1122. IC design layout diagram 1122 includes various geometrical patterns designed for an IC device 1160. The geometrical patterns correspond to patterns of metal, oxide, or semiconductor layers that make up the various components of IC device 1160 to be fabricated. The various layers combine to form various IC features. For example, a portion of IC design layout diagram 1122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1120 implements a proper design procedure to form IC design layout diagram 1122. The design procedure includes one or more of logic design, physical design or place and route. IC design layout diagram 1122 is presented in one or more data files having information of the geometrical patterns. For example, IC design layout diagram 1122 can be expressed in a GDSII file format or DFII file format.

Mask house 1130 includes data preparation 1132 and mask fabrication 1144. Mask house 1130 uses IC design layout diagram 1122 to manufacture one or more masks 1145 to be used for fabricating the various layers of IC device 1160 according to IC design layout diagram 1122. Mask house 1130 performs mask data preparation 1132, where IC design layout diagram 1122 is translated into a representative data file ("RDF"). Mask data preparation 1132 provides the RDF to mask fabrication 1144. Mask fabrication 1144 includes a mask writer. A mask writer converts the RDF to an image on a substrate, such as a mask (reticle) 1145 or a semiconductor wafer 1153. The design layout diagram 1122 is manipulated by mask data preparation 1132 to comply with particular characteristics of the mask writer and/or requirements of IC fab 1150. In FIG. 11, mask data preparation 1132 and mask fabrication 1144 are illustrated as separate elements. In some embodiments, mask data preparation 1132 and mask fabrication 1144 can be collectively referred to as mask data preparation.

In some embodiments, mask data preparation 1132 includes optical proximity correction (OPC) which uses lithography enhancement techniques to compensate for image errors, such as those that can arise from diffraction, interference, other process effects and the like. OPC adjusts IC design layout diagram 1122. In some embodiments, mask data preparation 1132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC design layout diagram 1122 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1122 to compensate for limitations during mask fabrication 1144, which may undo part of the modifications performed by OPC in order to meet mask creation rules.

In some embodiments, mask data preparation 1132 includes lithography process checking (LPC) that simulates processing that will be implemented by IC fab 1150 to fabricate IC device 1160. LPC simulates this processing based on IC design layout diagram 1122 to create a simulated manufactured device, such as IC device 1160. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1122.

It should be understood that the above description of mask data preparation 1132 has been simplified for the purposes of clarity. In some embodiments, data preparation 1132 includes additional features such as a logic operation (LOP) to modify the IC design layout diagram 1122 according to manufacturing rules. Additionally, the processes applied to IC design layout diagram 1122 during data preparation 1132 may be executed in a variety of different orders.

After mask data preparation 1132 and during mask fabrication 1144, a mask 1145 or a group of masks 1145 are fabricated based on the modified IC design layout diagram 1122. In some embodiments, mask fabrication 1144 includes performing one or more lithographic exposures based on IC design layout diagram 1122. In some embodiments, an electron-beam (e-beam) or a mechanism of multiple e-beams is used to form a pattern on a mask (photomask or reticle) 1145 based on the modified IC design layout diagram 1122. Mask 1145 can be formed in various technologies. In some embodiments, mask 1145 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1145 includes a transparent substrate (e.g., fused quartz) and an opaque material (e.g., chromium) coated in the opaque regions of the binary mask. In another example, mask 1145 is formed using a phase shift technology. In a phase shift mask (PSM) version of mask 1145, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1144 is used in a variety of processes. For example, such a mask(s) is used in an ion implantation process to form various doped regions in semiconductor wafer 1153, in an etching process to form various etching regions in semiconductor wafer 1153, and/or in other suitable processes.

IC fab 1150 includes wafer fabrication 1152. IC fab 1150 is an IC fabrication business that includes one or more manufacturing facilities for the fabrication of a variety of different IC products. In some embodiments, IC Fab 1150 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1150 uses mask(s) 1145 fabricated by mask house 1130 to fabricate IC device 1160. Thus, IC fab 1150 at least indirectly uses IC design layout diagram 1122 to fabricate IC device 1160. In some embodiments, semiconductor wafer 1153 is fabricated by IC fab 1150 using mask(s) 1145 to form IC device 1160. In some embodiments, the IC fabrication includes performing one or more lithographic exposures based at least indirectly on IC design layout diagram 1122. Semiconductor wafer 1153 includes a silicon substrate or other proper substrate having material layers formed thereon. Semiconductor wafer 1153 further includes one or more of various doped regions, dielectric features, multi-level interconnects, and the like (formed at subsequent manufacturing steps).

Details regarding an integrated circuit (IC) manufacturing system (e.g., system 1100 of FIG. 11), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

One aspect of this description relates to a method. The method includes specifying a target memory macro, and determining failure rates of function-blocks in the target memory macro based on an amount of transistors and area distributions in a collection of base cells. The method includes determining a safety level of the target memory macro, based upon a failure-mode analysis of the target memory macro, from a memory compiler, based on the determined failure rates.

One aspect of this description relates to computer program code stored on a non-transitory computer-readable medium for generating memory macros. The computer program code is configured to cause a system having at least one processor to execute: loading a table specifying an amount of transistors and area distributions in a collection of base cells, determining failure rates of function-blocks in a target memory macro based on an amount of transistors and area distributions in the collection of base cells, and determining a safety level of the target memory macro, based upon a failure-mode analysis of the target memory macro generated from the failure rates of the function-blocks.

One aspect of this description relates to a method. The method includes finding base cells in a target memory macro to form a collection of base cells, finding an amount of transistors and area distributions in the collection of base cells. The method further includes determining failure rates of function-blocks in the target memory macro based on the amount of transistors and the area distributions in the collection of base cells, and generating a failure-mode analysis for the target memory macro based on the failure rates of the function-blocks.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method comprising:
   specifying a target memory macro;
   determining failure rates of function-blocks in the target memory macro based on an amount of transistors and area distributions in a collection of base cells; and
   determining a safety level of the target memory macro, based upon a failure-mode analysis of the target memory macro, from a memory compiler, based on the determined failure rates.

2. The method of claim 1, wherein the safety level is one of safety levels for an Automotive Safety Integrity Levels (ASIL) certification.

3. The method of claim 1, further comprising:
   generating the target memory macro in addition to the failure-mode analysis from the memory compiler.

4. The method of claim 1, wherein each base cell in the collection of base cells is in a memory macro from a set of memory macros.

5. The method of claim 1, wherein each base cell in the collection of base cells is one of leafcells for constructing a set of memory macros.

6. The method of claim 1, wherein determining the failure rates of the function-blocks comprises:
   determining a failure rate of a function-block based upon one of an accumulated area occupied by the function-block or an accumulated amount of transistors in the function-block.

7. The method of claim 1, wherein determining the failure rates of the function-blocks comprises:
   finding one of a static failure rate or a transient failure rate of a function-block.

8. The method of claim 1, wherein generating the failure-mode analysis for the target memory macro comprises:
   defining failure-modes and a failure mode distribution for a function-block.

9. The method of claim 8, wherein generating the failure-mode analysis for the target memory macro further comprises:
   finding a single-point fault rate and a multiple-point fault rate of the function-block.

10. A computer program code stored on a non-transitory computer-readable medium for generating memory macros, the computer program code is configured to cause a system having at least one processor to execute:
    loading a table specifying an amount of transistors and area distributions in a collection of base cells;
    determining failure rates of function-blocks in a target memory macro based on an amount of transistors and area distributions in the collection of base cells; and
    determining a safety level of the target memory macro, based upon a failure-mode analysis of the target memory macro generated from the failure rates of the function-blocks.

11. The computer program code of claim 10, further comprising:
    generating the target memory macro in addition to the failure-mode analysis.

12. The computer program code of claim 10, wherein determining the failure rates of the function-blocks comprises:
    determining a failure rate of a function-block based upon one of an accumulated area occupied by the function-block or an accumulated amount of transistors in the function-block.

13. The computer program code of claim 10, wherein determining the failure rates of the function-blocks comprises:
    finding one of a static failure rate or a transient failure rate of a function-block.

14. The computer program code of claim 10, wherein generating the failure-mode analysis for the target memory macro comprises:
    defining failure-modes and a failure mode distribution for a function-block; and
    finding one of a single-point fault rate or a multiple-point fault rate of the function-block.

15. A method comprising:
    finding base cells in a target memory macro to form a collection of base cells;
    finding an amount of transistors and area distributions in the collection of base cells;
    determining failure rates of function-blocks in the target memory macro based on the amount of transistors and the area distributions in the collection of base cells; and
    generating a failure-mode analysis for the target memory macro based on the failure rates of the function-blocks.

16. The method of claim 15, further comprising:
    determining a safety level of the target memory macro, based upon the failure-mode analysis of the target memory macro.

17. The method of claim 15, further comprising:
    generating the target memory macro and the failure-mode analysis from a memory compiler.

18. The method of claim 15, further comprising:
    specifying the target memory macro with one or more of a size parameter, a feature parameter, or a combination of the size parameter or the feature parameter.

19. The method of claim 15, wherein each base cell in the collection of base cells is one of a bitcell, a timer cell, a read-and-write controller cell, a data-input cell, a data-output cell, a sense amplifier cell, a column multiplexer cell, a row pre-decoding decoder, a column pre-decoding decoder, a row address decoder, a column address decoder, or a word-line driver.

20. The method of claim 15, wherein finding the amounts of transistors and the area distributions in the collection of base cells comprises:
    determining an amount of transistors in each base cell chosen from the collection of base cells and determining an area occupied by each chosen base cell chosen from the collection of base cells.

* * * * *